US009437012B2

(12) United States Patent
Gefen et al.

(10) Patent No.: US 9,437,012 B2
(45) Date of Patent: *Sep. 6, 2016

(54) MULTIPLE-OBJECT TRACKING AND TEAM IDENTIFICATION FOR GAME STRATEGY ANALYSIS

(71) Applicant: Disney Enterprises, Inc., Burbank, CA (US)

(72) Inventors: Smadar Gefen, Burbank, CA (US); Gregory House, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/686,111

(22) Filed: Apr. 14, 2015

(65) Prior Publication Data
US 2015/0221096 A1 Aug. 6, 2015

Related U.S. Application Data

(62) Division of application No. 12/403,857, filed on Mar. 13, 2009, now Pat. No. 9,031,279.

(60) Provisional application No. 61/079,203, filed on Jul. 9, 2008.

(51) Int. Cl.
G06T 7/00 (2006.01)
G06T 7/20 (2006.01)
A63B 24/00 (2006.01)

(52) U.S. Cl.
CPC .............. *G06T 7/2093* (2013.01); *G06T 7/204* (2013.01); *A63B 2024/0056* (2013.01); *G06T 2207/30224* (2013.01)

(58) Field of Classification Search
CPC ................. G06T 7/2093; G06T 7/204; G06T 2207/30224; A63B 2024/0056
See application file for complete search history.

(56) References Cited

U.S. PATENT DOCUMENTS

| 9,094,615 B2 * | 7/2015 | Aman ................... G01S 3/7864 |
| 2003/0040815 A1 * | 2/2003 | Pavlidis ................. G06F 3/005 700/48 |
| 2010/0208070 A2 * | 8/2010 | Haynes .................. G07C 5/085 348/148 |

* cited by examiner

*Primary Examiner* — Kim Vu
*Assistant Examiner* — Molly Delaney
(74) *Attorney, Agent, or Firm* — Fay Kaplun & Marcin, LLP

(57) ABSTRACT

A method for automatically tracking multiple objects from a sequence of video images that may extract raw data about participating elements in a sporting, or other event, in a way that does not interfere with the actual participating elements in the event. The raw data may include the position and velocity of the players, the referees, and the puck, as well as the team affiliation of the players. These data may be collected in real time and may include accounting for players moving fast and unpredictably, colliding with and occluding each other, and getting in and out of the playing field. The video sequence, captured by a suitable sensor, may be processed by a suitably programmed general purpose computing device.

21 Claims, 14 Drawing Sheets

MULTIPLE-OBJECT TRACKING AND TEAM IDENTIFICATION FOR GAME STRATEGY ANALYSIS

CROSS REFERENCE TO RELATED APPLICATIONS

This application is related to, and claims priority from, U.S. Provisional Patent application No. 61/079,203 filed on Aug. 22, 2008 by S. Gefen et al. entitled "Multi Object Tracking and Team Identification for Game Strategy Analysis", the contents of which are hereby incorporated by reference.

FIELD OF THE INVENTION

The present invention relates to the field of computer vision and image processing, and more specifically, to the real-time recognition and tracking of objects moving within a field of view and captured by one or more video cameras.

BACKGROUND OF THE INVENTION

Increasing viewership of major league sports by enhancing game viewing experience has the potential to increase advertisement-based revenues. This applies to all major league sports, including, but not limited to, hockey (NHL), basketball (NBA), and soccer (MLS). A good example of such a game enhancing method is the existing First-Down Line (FDL). The FDL is a fluorescent yellow or orange line that appears on TV broadcast of football games. The FDL allows viewers at home to observe when a player gains a first-down. This FDL graphic is added to the broadcast video in real-time using a video-insertion technology introduced by PVI in 1998 and is described in detail in, for instance, U.S. Pat. No. 5,264,933, the contents of which are hereby incorporated by reference, and by SportVision and is described in detail in, for instance, U.S. Pat. No. 6,266,100 the contents of which are hereby incorporated by reference. The FDL has since become an integral part of NFL game broadcasts.

Similarly, statistical information about players and team performance as well as ongoing analyses of game progress may be a significant factor in improving game coverage, and, in doing so, increasing viewership. For example, analyzing team strategy and visualizing the teams' relative formation and advances in a playback during breaks could add useful insights into game dynamics. Another example of improving game coverage is using information that could be derived in real-time from puck shots in hockey.

The utility of such tracking data, generated throughout a sporting event, may not be limited to during-the-game statistics presentation for viewing/reporting enhancement. The tracking data collected in real-time during the sports event may, for instance, be archived into a database and used later to, for instance, index a library of games. Much information could be derived from such a database including, but not limited to, learning about the performance history of certain players or certain teams, doing comparative analyses between for instance players or teams, and generally computing statistics about any event of interest. It could also be used as a tool for training or demonstrating remarkable player and team maneuvers and tactics.

There are many types of applications that could be derived based on the positional data of the players and their team affiliation (the raw data), including various statistical analyses, graphical illustrations, and game dynamic visualizations. However, obtaining the raw data to produce such real-time tracking statistics presents many significant challenges. For instance, the large amount of video information that has to be analyzed from each frame of video, which may be high-definition video. Accomplishing this using current technology requires the development of innovative methods.

SUMMARY OF THE INVENTION

Briefly described, the present invention is a system and method for automatically tracking multiple objects from a sequence of video images of those objects. In a preferred embodiment, the system and method of this invention, hereinafter referred to as either the tracking method or the tracking process, are such that the objects to be recognized may be moving rapidly and may be undergoing occlusion.

The tracking method of this invention may, for instance, extract raw data about participating elements in a sporting, or other event, in a non-obtrusive manner, i.e., in a way that does not interfere with the actual participants in the event. The raw data may, for instance, include the position and velocity of the players, the referees, and the puck, as well as the team affiliation of the players. These data may be collected in real time and may include accounting for players moving fast and unpredictably, colliding with and occluding each other, and getting in and out of the playing field. Adding to this internal complexity, the tracking method may also take into account the vibrations of the cameras, the varying light conditions in the arena, and camera flashes. This invention may deliver a unified solution for continuous real-time, multiple-object, and multiple-view tracking in these and similar challenging conditions, and may do so with a flexibility that allows deployment at different field layout conditions.

In a preferred embodiment of the tracking method, a video sequence is processed by a suitably programmed, general purpose computing device. The video sequence may be captured by a suitable sensor such as, but not limited to, a high definition digital camera. The sensor may be positioned at any viewpoint in the scene, including, but not limited to, side-view and overhead-view. In an alternative embodiment of the invention, several cameras may be used to provide full coverage of the field. For instance, each such sensor may generate the video input for one tracking process. Camera views may overlap to allow the computation of off-ground objects' trajectories or to provide system redundancy. The tracking data, provided by all tracking processes, may then be fused together to form a coherent representation of the whereabouts of all the elements on the field and their team affiliation.

The tracking method may first stabilize the input video and then detect moving foreground regions by, for instance, utilizing a background subtraction method. The background subtraction method separates the foreground regions from the scene background for each frame using a background model. The background model—which may be a reference image—may be generated through a training process prior to the game and may be adapted throughout the game to meet changing light conditions as well as physical changes on the field. The detected moving foreground regions may represent desired elements such as, but not limited to, the players, the referees, the puck or the ball, or some combination thereof. The detected moving foreground regions may also, or instead, include undesired noise elements. Prior information regarding the expected characteristics of the desired elements—pre-selected objects—may be used to filter out this noise.

Following foreground detection, the tracking method may characterize a foreground as a measurement that, for instance, represents a single-player observation, a multi-player observation, or a non-player observation such as, but not limited to, a puck or a ball. Foreground related information such as feet position and environs may also be calculated and stored into the measurement's data structure. Tracking an object that is associated with a single-player measurement (isolated object) is relatively simple. On the other hand, tracking an object that is associated with a multi-player measurement, typically represents two or more possibly occluding players, requires a further analysis. To this end, a particle-filtering technique, utilizing color and players' formation, may be used for tracking in order to maintain the separate tracks of closely engaging players. The tracking method in the present invention uses cues such as, but not limited to, uniform and skin color, players' figure size, and surrounding players' formation to maintain consistent and lengthy tracks of elements in the field. In addition, it may use the color characteristic of the tracked objects to classify them into teams such as a home group, a guest group, and a referee group or some combination thereof.

These and other features of the invention will be more fully understood by references to the following drawings.

DETAILED DESCRIPTION

The present invention uses and integrates state-of-the-art techniques from computer vision and image processing to track players/referees and puck/ball that are moving fast and unpredictably while engaging and occluding each other. Moreover, athletes playing in a team sport change their pose rapidly and frequently, which makes tracking their silhouettes especially difficult relative to, for example, tracking pedestrians. Adding to the complexity of the tracking problem is the need to account for vibrations of the camera's platform, changing light conditions, and frequent flashes in the arena. This invention provides a vision-based tracking solution that may be used in real-time and may be transparent-to-game-proceeding tracking solution.

The tracking method of the present invention is described below in the context of tracking hockey players, referees, and the puck during a hockey match. A person of ordinary skill in the art will appreciate that the tracking method of this invention may be applied to a wide range of events including, but not limited to, sports games and events such as football, soccer, field hockey, rugby, cricket, tennis, track and field, swimming, gymnastics, as well as for non-sporting applications such as, but not limited to, pedagogical, security and traffic management systems by, for instance, tracking children in a playground or play area, tracking people on surveillance cameras in a train station or airport environment, and tracking cars and trucks on traffic cameras.

A preferred embodiment of the invention will now be described in detail by reference to the accompanying drawings in which, as far as possible, like elements are designated by like numbers.

Although every reasonable attempt is made in the accompanying drawings to represent the various elements of the embodiments in relative scale, it is not always possible to do so with the limitations of two-dimensional paper. Accordingly, in order to properly represent the relationships of various features among each other in the depicted embodiments and to properly demonstrate the invention in a reasonably simplified fashion, it is necessary at times to deviate from absolute scale in the attached drawings. However, one of ordinary skill in the art would fully appreciate and acknowledge any such scale deviations as not limiting the enablement of the disclosed embodiments.

Figure 1:
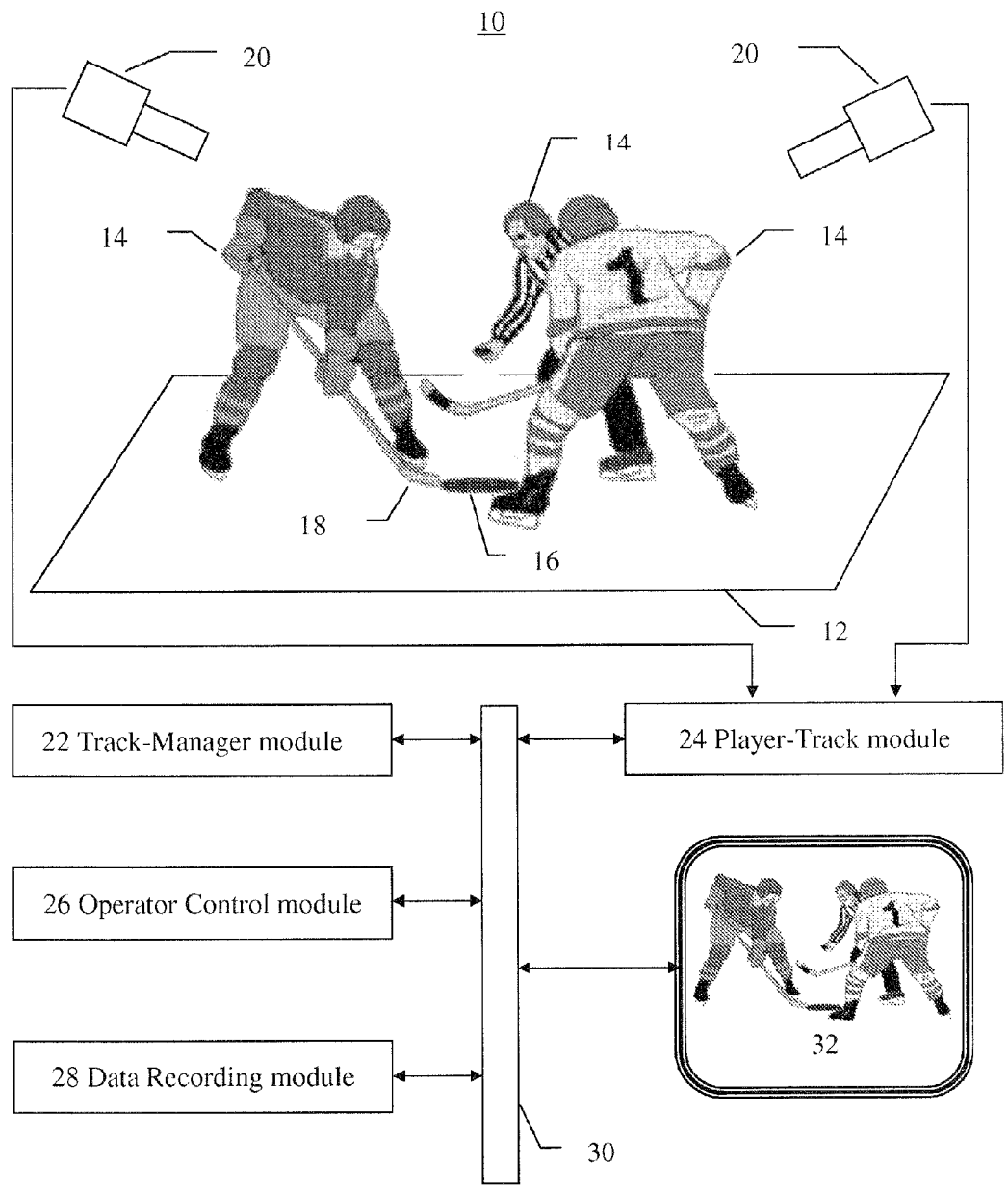
FIG. 1 shows an exemplary embodiment of the present invention featuring a multiple-player and multiple cameras tracking system.

In an exemplary embodiment of the present invention, shown in FIG. 1, cameras 20 are positioned at various locations at the arena to allow a full coverage of the scene, in this case the game field 12. When off-ground positioning of objects, such as the puck 16, is required, an overlapping coverage of at least two views should be provided. Otherwise, there are typically no constraints on the locations of the cameras. Each video signal may be captured in one of the Player-Track computing units 24 and may be fed into the tracking algorithm, one frame at a time. At each iteration the tracking algorithm typically analyzes the current video frame to first detect and then track moving objects. At the end of each iteration, Player-Track may broadcast information about active tracks—currently tracked objects—over, for instance, an Ethernet 30. This information about active tracks may for instance, include, but is not limited to, the real-world position of an object, the velocity of the object and the team to which the object belongs, or some combination thereof. The Track-Manager 22 may receive the messages broadcasted from each Player-Track 24 in the system and may compile all the received information into one coherent representation. Then, the Track-Manager 22 may broadcast back on the Ethernet 30 the fused tracking data to be received by a third party for game enhancement or to be stored in a database 28 for off-line processing.

Figure 2:
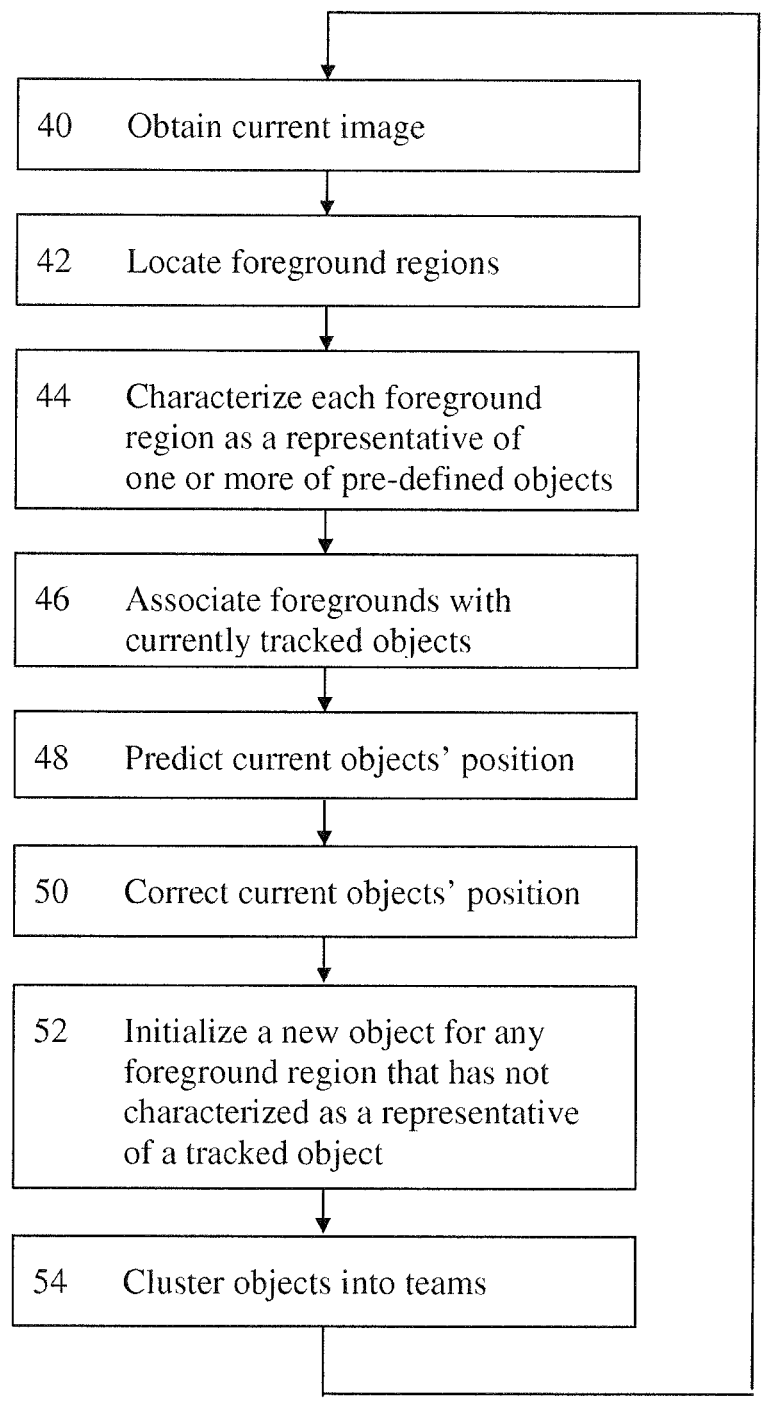
FIG. 2 shows a top level flow diagram of the tracking method.

A top level flow diagram of the tracking method is shown in FIG. 2. The first two steps of the algorithm consist of obtaining the current image 40 and locating the foreground regions 42. The latter may includes stabilizing the video, normalizing the color, detecting the foreground regions using the reference images, and extracting their outlines.

Next, each foreground is characterized 44 based on features such as shape and color metrics as representative of one or more of the pre-selected objects. Due to occlusion, often, a foreground may represent more than one object. Hence, next, each tracked object is assigned to be represented by one foreground region or, alternatively, each foreground is associated with one or more tracked objects 46. This process, referred to as measurement-to-track association, is critical to resolving multi-object tracking where occlusion is frequent and complex.

The current position of each tracked object is then predicted 48 utilizing a motion model and the characteristic of the object associated measurement. Following prediction, the object position is further refined 50. This stage is especially important when several objects share the same representative foreground. Refining each object position, then, is done with respect to the representative foreground and with respect to the formation of neighboring objects. In the probabilistic approach suggested by this invention the likelihood of an object being located at a certain position is a function of the similarity between the object's color characteristic and the color characteristic of its representative foreground, as well as the relative position of the object to its neighboring objects. Note, that in steps 48 and 50 tracks are processed independently and therefore implementation can be parallelized, taking advantage of a multiprocessing environment.

Next, in step 52, measurements without object association are examined. A measurement that is characterized as a single object measurement will be considered as a new observation indicative of a new object entering the scene. In this case, a new track data structure is initiated including the new object's characteristic such as position, color, and object's ROI. Finally, the tracked objects are clustered into groups 54, in this case, the home team, guest team, and referees. Detail description of the above tracking method steps will be presented below.

Figure 3:
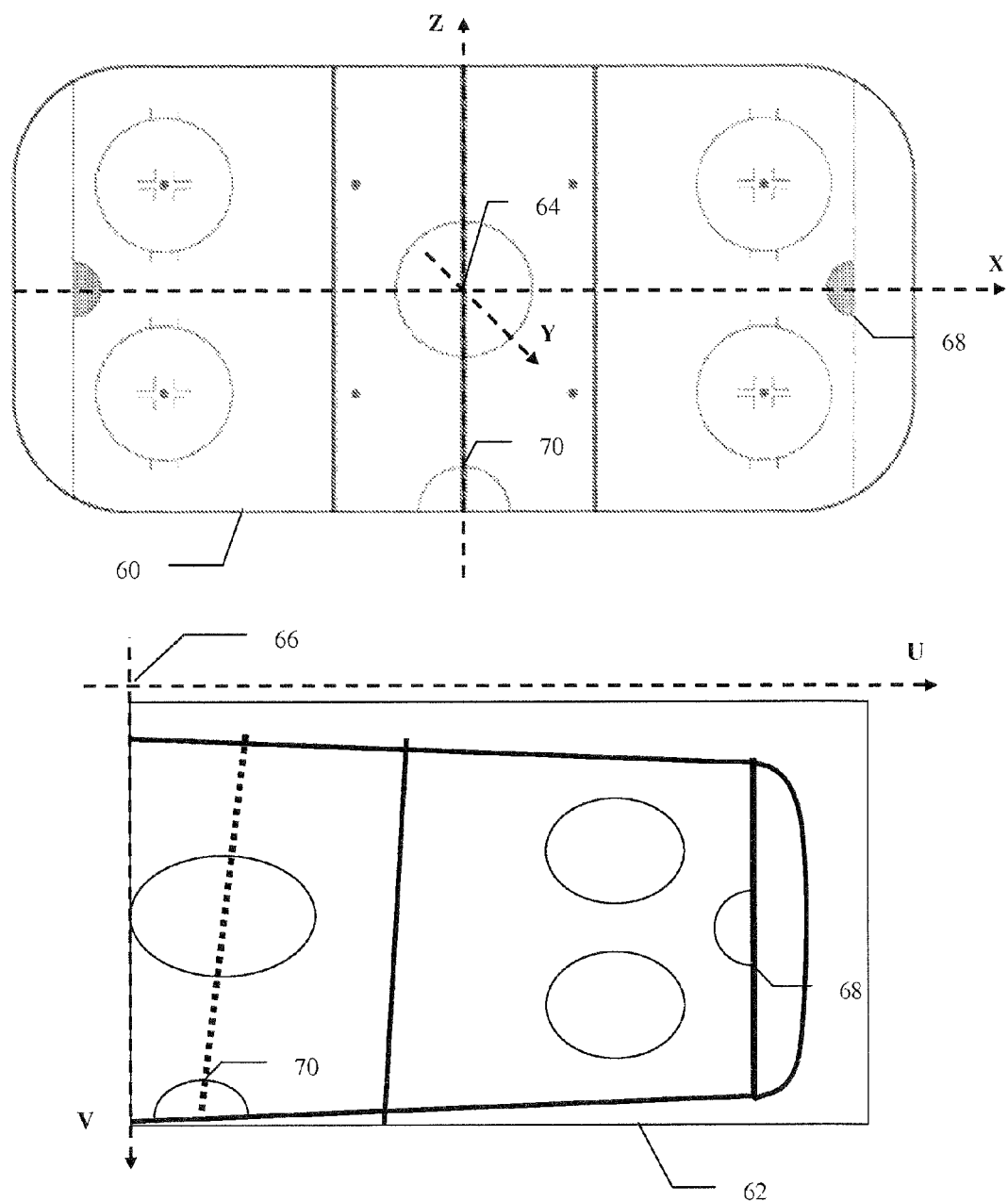
FIG. 3 illustrates the camera calibration.

Prior to employing tracking, knowledge of the cameras' model is required to compute the position of tracks in real-world coordinates and to characterize the foregrounds in real-world space. The relation between a real-world point at the scene and its projective point in image-space is determined by a calibration procedure, as illustrated in FIG. 3. Calibration may be carried out during system setting once the cameras are positioned in place. A representation of the scene 60, in this case, the rink, in real-world coordinates 64 is compared with the scene's projective image 62 supported by image-space coordinates 66. Correspondence is established by pairing landmark points such as the pair 68 and the pair 70. This correspondence information allows for the computation of camera parameters, including the camera's gimbal position, pan, tilt, roll, and image distance from the lens. These camera parameters define the mapping between a point in real-world space, denoted hereafter as x=(x, y, z), and its projective point in image space, denoted hereafter as u=(u, v).

The first step when automatically tracking objects is detection of the dynamic elements imaged by the system's sensors—locating foreground regions 42. Typically, locating the foreground regions is achieved by background subtraction. The static scene, the background, is statistically represented by reference images. Comparing the reference images against the current image allows demarcation of the foreground regions from the background region. In the present invention the background is modeled by three reference images created via training on a video sequence captured prior to the tracking operation. The reference images, then, are accessed by the background subtraction process in 42 and are also updated to account for lighting changes in the scene during tracking.

Figure 4:
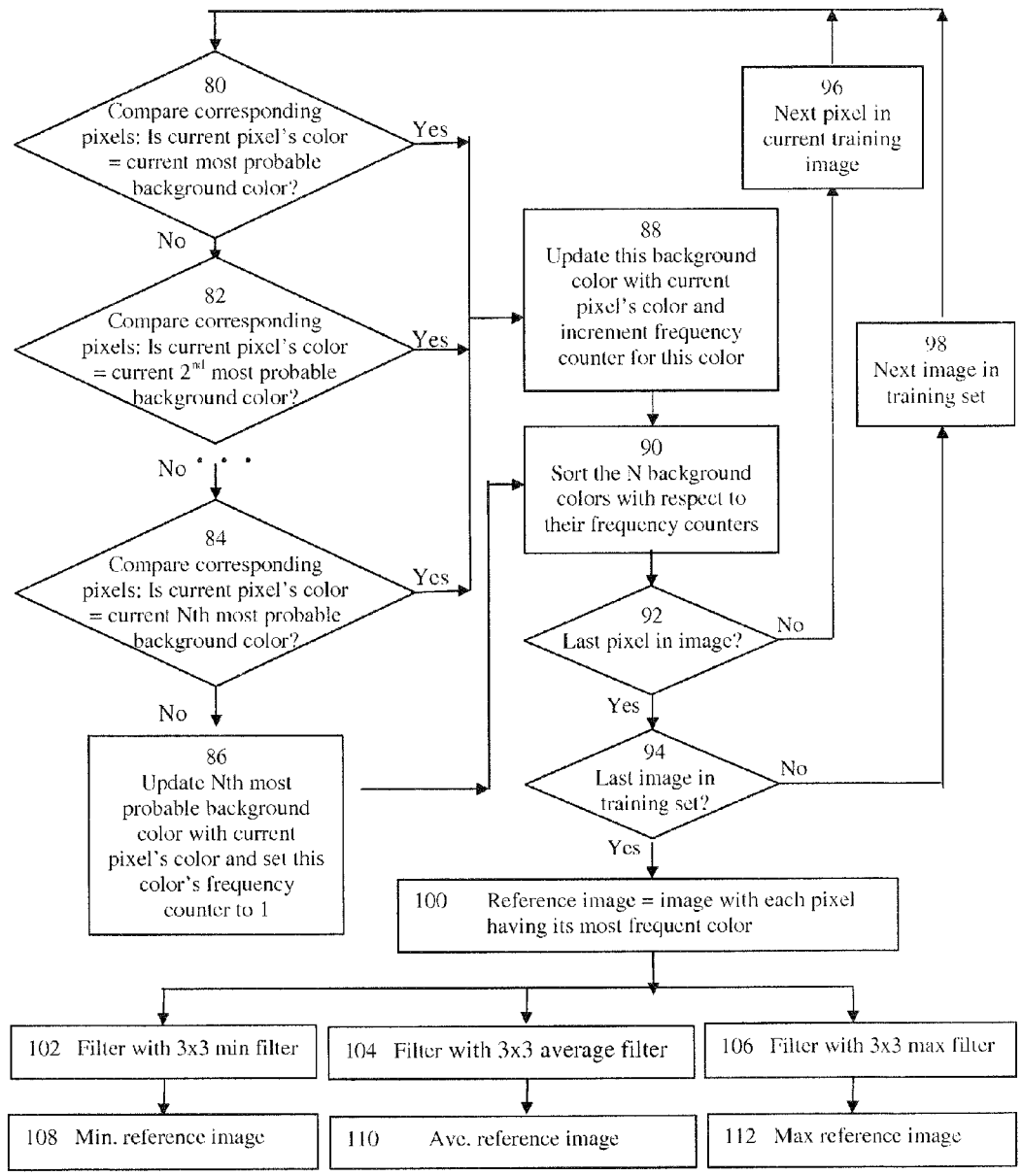
FIG. 4 shows a flow diagram of the method for reference images training.

FIG. 4 is a flow diagram describing the creation of the reference images out of a training video sequence. Processing through the training video sequence, the goal is to find the most probable color value for each image pixel. Assuming that any foreground element in this video sequence is in motion, most of the time the image pixels represent a background color. To represent the background model, a record of the N most probable background color values is maintained by the algorithm for each pixel in the image. In addition, a frequency counter is assigned to each one of these N probable color values to record the number of corresponding pixels out of the training video sequence that match each one of these color values.

The algorithm for calculating the reference images starts with initializing the above background model records to zero. Going through the pixels of the first image in the training video sequence, each pixel is compared first with its corresponding most probable background color 80. If this pixel color value is within a predefined range of this most probable background color, then this pixel color value is used to update the value of the most probable background color and its frequency counter is increased by one 88. Otherwise, this pixel is compared with its corresponding second most probable background color 82. Similarly, at this point, if this pixel color value is within a predefined range of the second most probable background color, then this pixel color value is used to update the value of this second most probable background color and its frequency counter is increased by one 88. This comparison may go all the way through to comparing the current pixel value against the Nth most probable background 84. However, if the current pixel value was not found to be within range of any of the N background color values, the Nth most probable background is set to the current pixel value and its frequency counter is set to one 86.

Once, the matching background color has been updated and its counter incremented 88, the N current background colors are sorted with respect to their frequency counters 90. This way the order of the probable background colors from most probable to least probable is maintained so that accessing them is more efficient all through the process. Completing processing of all pixels 96 through all training video sequence 98, the reference image is established as the one composed of all most probable background colors 100. Next, three representative reference images are created. The first one is a minimum reference image 108, the output of a 3×3 minimum filtering of the reference image 102. The second one is a maximum reference image 112, the output of a 3×3 maximum filtering of the reference image 106. And the third one is an average reference image 110, the output of a 3×3 average filtering of the reference image 104. These three reference images represent the scene background, and as such are used to locate the foreground regions 42 as will be explained next.

Figure 5:
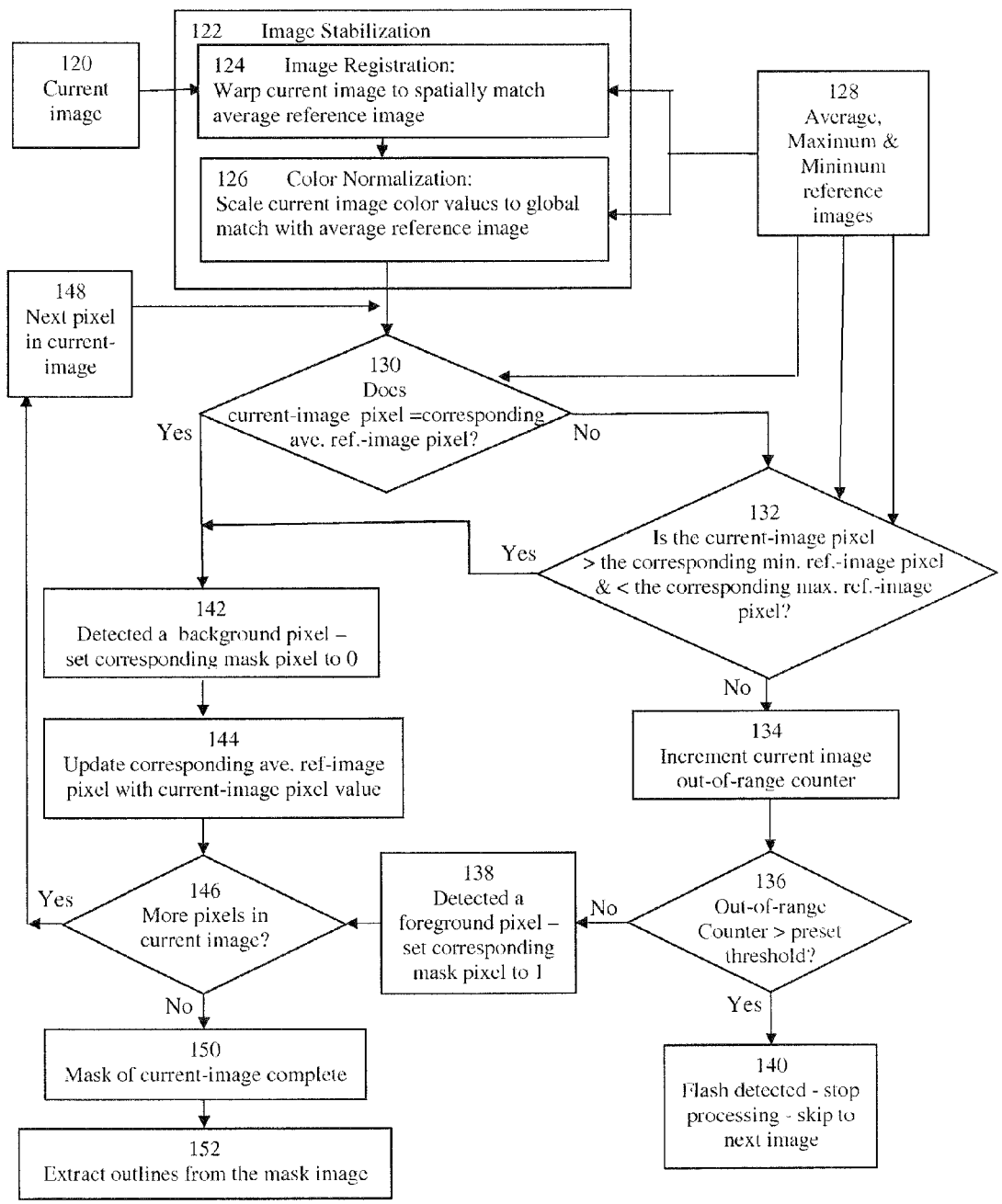
FIG. 5 shows a flow diagram of the background subtraction algorithm used for foregrounds detection.

FIG. 5 illustrates the steps performed toward locating the foreground regions in the current video frame. In the first step an image stabilizer may be employed 122. In practice, changes in light conditions and/or movements of camera's platform interfere with the quality of the background subtraction operation. Especially, outdoors deployment may introduce camera vibrations and color deviations that should be accounted for before background subtraction takes place. This is typically addressed by 1) employing an image registration procedure to compensate for instantaneous spatial changes in camera location 124, and by 2) employing color normalization to correct for global color variation 126. These two operations are illustrated in FIGS. 6 & 7 and will be described later on.

The current image 120, optionally after employing the stabilization procedure 122, is compared with the reference images 128. First, each current image pixel is compared against the corresponding pixel in the average reference image 130; if within a predefined range, it is determined to be a background pixel 142 and the corresponding pixel in a mask (binary) image is set to zero. Otherwise, if the pixel is not within a predefined range, a second test takes place: the value of the current image pixel is checked to verify if it is between the values of corresponding pixels from minimum and maximum reference images 132. If it is within this range, the current image pixel is determined to be a background pixel 142; otherwise, an out-of-range counter is incremented by one 134. The purpose of the out-of-range counter is to detect an occasional flash that disables proper further analysis of the current image. Thus, if the out-of-range counter is above a pre-defined threshold 136, a flash is detected and processing stops for the current image 140. Otherwise, the current pixel is determined to be a foreground pixel 138 and the corresponding pixel in the mask image is set to one. Processing of all pixels accordingly 146 leads to completion of the mask image that constitutes a binary representation of the foreground regions in the current image 150. The last step includes delineating the outline of each foreground region and storing it in a vector 152. An outline vector consists of the coordinate points of pixels on the foreground's boundary. A foreground's outline embodies shape information, and so is instrumental for its characterization.

Camera vibrations and instantaneous changes in illumination are a common reality in the field and should be accounted for when relating one video frame to another. The background subtraction technique as described in steps 130 through 150, assumes a fixed camera position, or, alternatively, that the current image was compensated for any spatial deviation relative to the average reference image.

Figure 6:
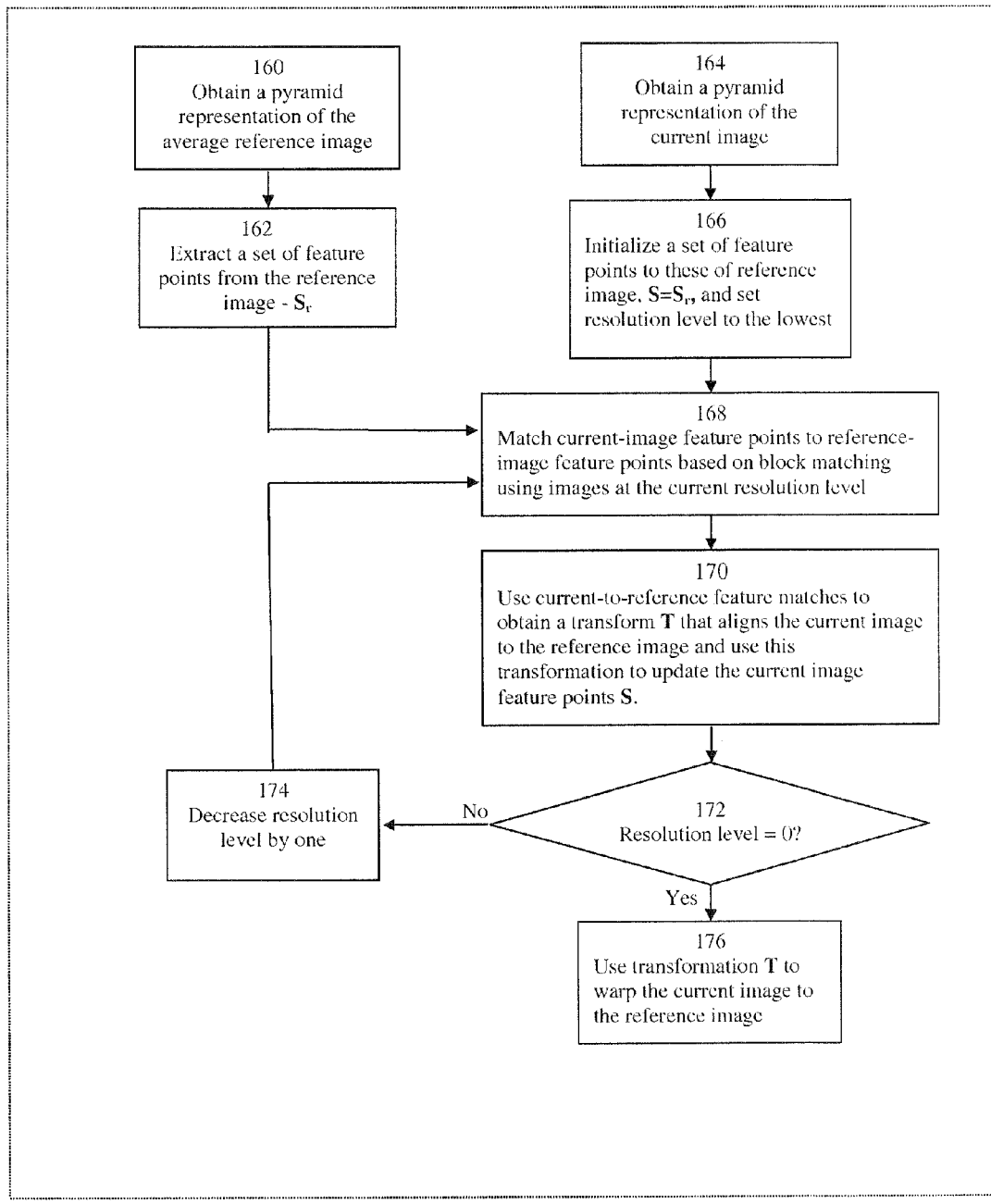
FIG. 6 shows a flow diagram of the image registration algorithm used to compensate for camera vibration.
Figure 7:
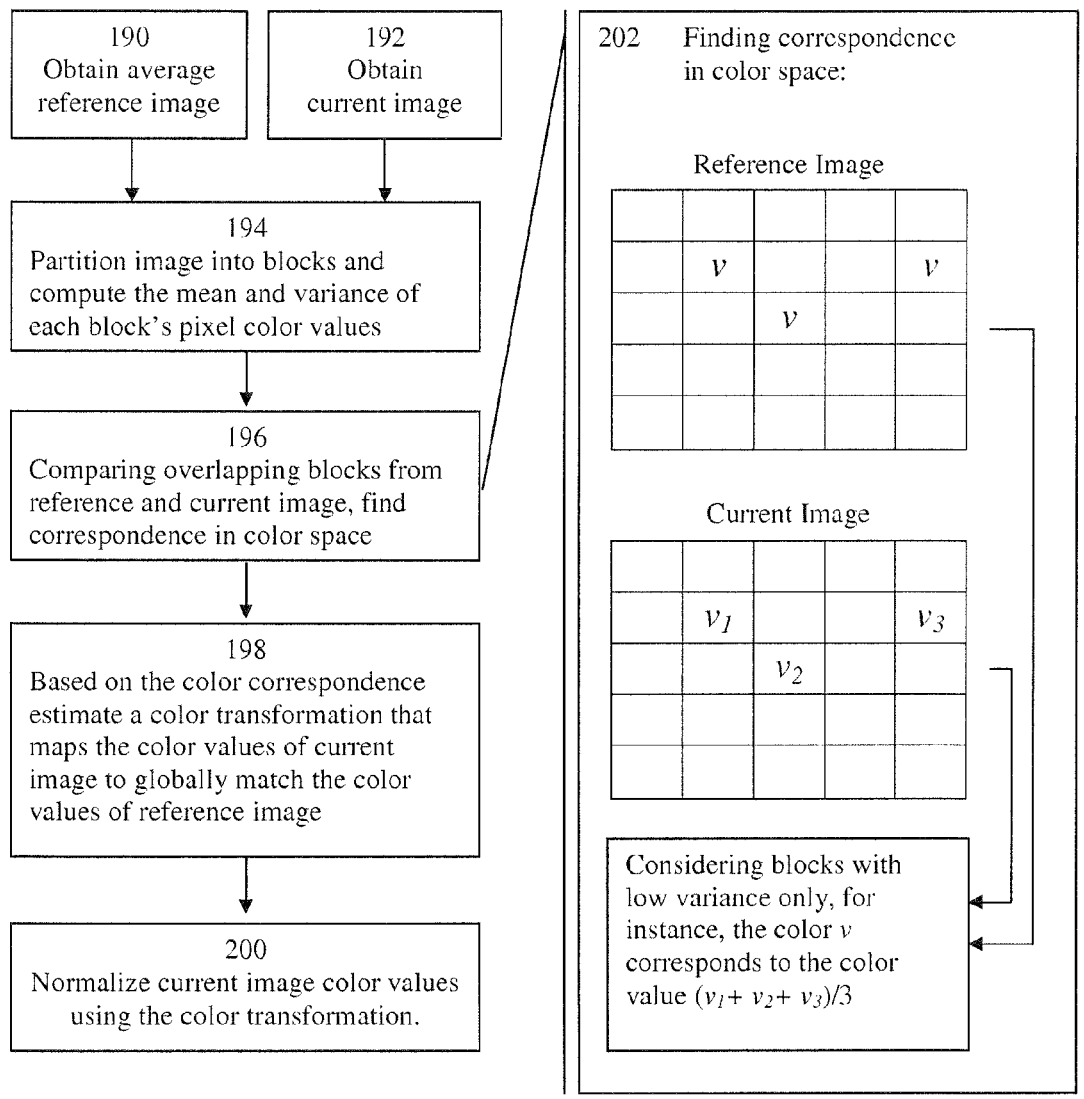
FIG. 7 shows a flow diagram of the color normalization algorithm used to correct for color variance.

FIG. 6 illustrates the image registration procedure used to map the current image onto the average reference image. In other words, the average reference image and the current image are brought into registration. The registration algorithm estimates the spatial transformation that maps a point in the current image-space to its corresponding point in the average reference image-space. The transformation function can be rigid, affine, or projective, depending on the severity of the vibrations and the distance between the camera and the target. For example, in the case of mild vibrations, an affine transformation is typically sufficient:

$$u_r = \begin{bmatrix} u_r \\ v_r \end{bmatrix} = \begin{bmatrix} t_{11} & t_{12} \\ t_{21} & t_{22} \end{bmatrix} \cdot \begin{bmatrix} u \\ v \end{bmatrix} + \begin{bmatrix} d_1 \\ d_2 \end{bmatrix} \equiv T \cdot u \quad (1)$$

A feature based registration method may be employed to resolve this transformation.

It is common practice in image processing to analyze patterns at different resolutions. A multi-resolution approach, in general, reduces algorithm complexity and prevents optimization algorithms from being trapped at local extremum. Thus, in FIG. 6 the reference 160 and current frames 164 are sub-sampled into an L-level-pyramid representation. Next, a set of feature points, $S_r = \{(u, v)_i; i=1, \ldots, N\}$, from the average reference image is compiled 162. These feature points represent high curvature points from the field plane 12. Similarly, a set of points, $S = \{(u, v)_i; i=1, \ldots, N\}$, is defined and initialized as $S = S_r$, in step 166. Having corresponding sets, $S_r$ and $S$, it is straightforward to calculate T using a weighted least squared error (WLSE) estimator, for instance. The challenge is in obtaining a set S that corresponds to the set $S_r$. To this end, first a set that is merely matching $S_r$ (not corresponding necessarily) is found 168, and then, using, for instant, the RANSAC method, the transformation parameters: $[t_{11} \, t_{12} \, t_{21} \, t_{22} \, d_1 \, d_2]$ are estimated together with the corresponding set S 170. This feature-based image registration method will be explained in detail next.

The registration algorithm computes the transformation T in a coarse-to-fine order. At each level of resolution a matching feature set S to $S_r$ is pursued 168. First, the points $(u_r, v_r)_i \in S_r$ and $(u, v)_i \in S$ are scaled down to fit the current resolution level. Then, a block matching technique may be used wherein a block centered at a feature point $(u_r, v_r)_i \in S_r$ is compared with blocks from a neighborhood centered at the current feature point $(u, v)_i \in S$. Thus, the pair of blocks with the highest correlation will result in a match. Note that this pair of points has a matching texture but does not necessarily represent correspondence. Therefore, only a subset of $S_r$ and $S$ that better represents correspondence should be used to estimate the transformation parameters in (1).

In step 170 the RANSAC (Random Sample Consensus) method may be utilized to estimate the transformation parameters in (1) from $S_r$ and the current matching set S. The RANSAC method is known to be a robust scheme to fit a mathematical model to given data in the presence of outliers, and it may successfully be used in step 170 to recover the transformation T and to update the points in set S as follows: $u = T^{-1} \cdot u_r$. The updated points in set S are in better correspondence with the points in $S_r$ for the current resolution level. To obtain a refinement for T and S, processing proceeds to the next, higher, resolution level 174. Completing processing at all resolution levels 172, the last and most refined estimate for the transformation T is used to map the current image onto the average reference image 176.

Once spatial vibrations have been accounted for through image registration in step 124, the image stabilizer performs color normalization in step 126. Variation in image illumination may occur due to a change in the angle between a light source and the camera or, alternatively, a jitter in camera aperture and shutter speed. Here the color values of the current frame are altered through polynomial transformations to globally match the average reference image. In the case where YUV color model is used, for example, the Y value may be mapped independently, while the mapping operator for the color components, U and V, may be coupled since their values are highly correlated.

FIG. 7 illustrates the method for color normalization where, first, the average reference image and current image are partitioned into, for example, 8 by 8 blocks, and then each block's mean and variance are calculated 194. Next, to establish color correspondence, overlapping blocks from the average reference image and the current image are examined

196. If the overlapping blocks' means are within a certain range and their variances are small enough, a correspondence in color space is established as illustrated in 202. The color transformation may be defined $$Y_n = a_1 \cdot Y + a_0$$

$$U_n = b_2 \cdot U + b_1 \cdot V + b_0$$

$$V_n = c_2 \cdot U + c_1 \cdot V + c_0 \tag{2}$$

where $(Y_n, U_n, V_n)$ is the altered color value and $[a_0, a_1, b_0, b_1, b_2, c_0, c_1, c_2]$ are the transformation parameters. Using the correspondences above, the transformation parameters may be computed using a WLSE estimator 198.

Back to FIG. 5, the realization of video stabilization in step 122 is optional and its inclusion depends on the conditions in the field. For example, in outdoor deployment the camera may be exposed to vibration due to wind load or any non-stationary camera platform; while in indoor deployment only small (sub-pixel) vibrations may occur. Step 132 sufficiently addresses sub-pixel displacements, but in the case of larger displacements, image registration 124 and possibly color normalization 126 should be employed first before proceeding to background subtraction.

Figure 8:
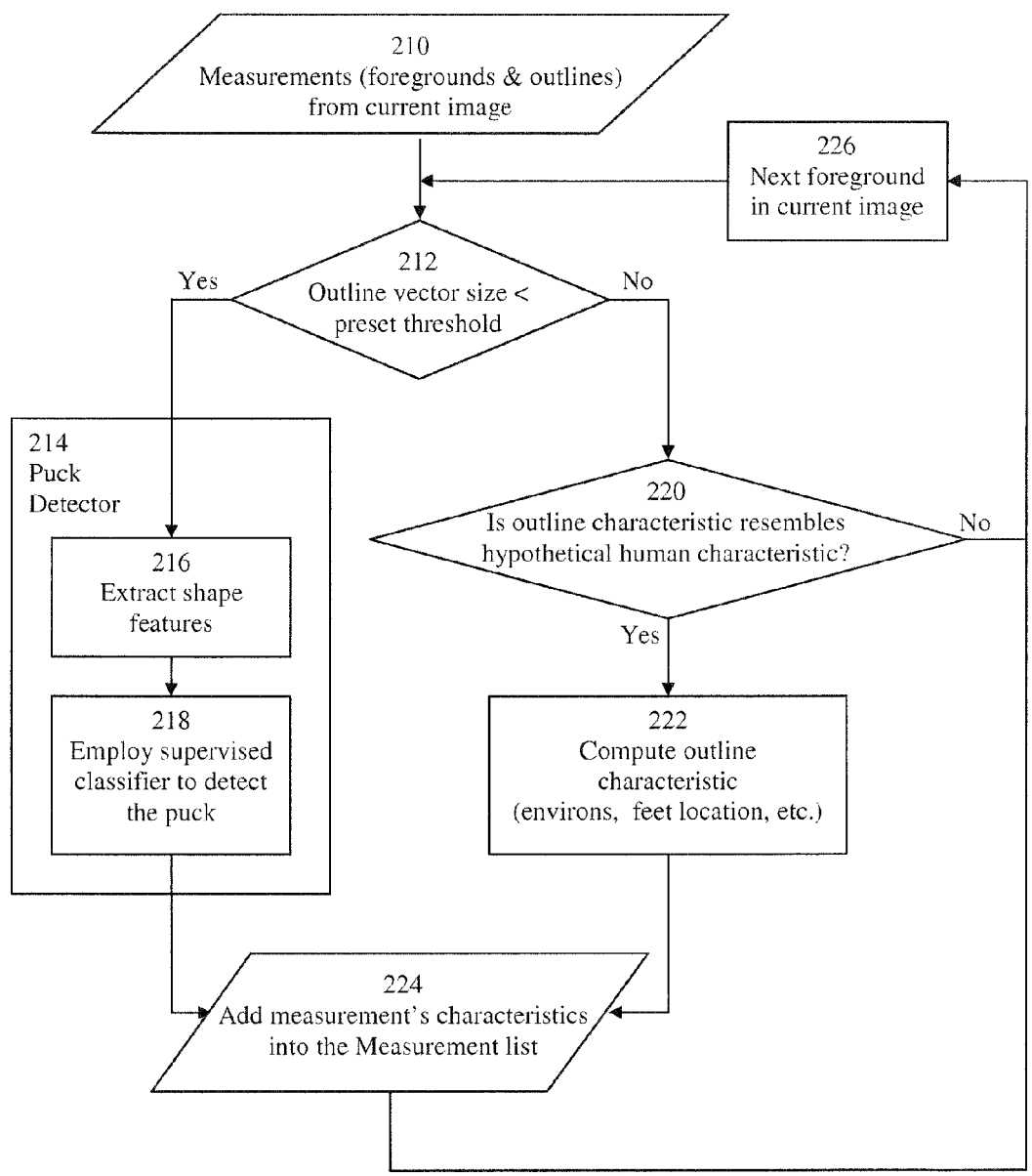
FIG. 8 shows the measurements characterization stage in the tracking method.

Following the foreground regions locating algorithm in step 42, the measurements characterization, step 44, is carried out as illustrated in FIG. 8. A measurement, including a foreground region and its outline, contains color and shape information that can be analyzed using various pattern recognition methods in order to learn about the nature of the object or objects it represent. In the context of a hockey game the objects of interest are the players, the referees, the hockey sticks, and the puck. Therefore, in our exemplary embodiment each detected foreground is characterized and analyzed to determine which one, or more, of these pre-defined objects they may represent. The tracking method later uses this information to carry out tracking of these pre-defined objects, specifically, to associate detected measurements to tracked objects.

In the hockey game case, first, the outline length (vector size) is examined to determine if a measurement is likely to represent a puck 212. If the outline length is smaller than a preset threshold, then a candidate for a puck measurement is detected. Otherwise, the foreground's area and bounding ROI are examined to determine if it is likely to represent a human or a group of connected and/or occluding humans 220. For example, the foreground's area may be compared with the area of the ROI of a player hypothetically positioned at the measurement vicinity. Or the height of a foreground's ROI may be compared with the height of the ROI of a player hypothetically positioned at the measurement vicinity. If the foreground's characteristics are found to be those of a human/humans, then processing proceeds to step 222, otherwise processing proceeds to the next foreground 226.

Figure 9:
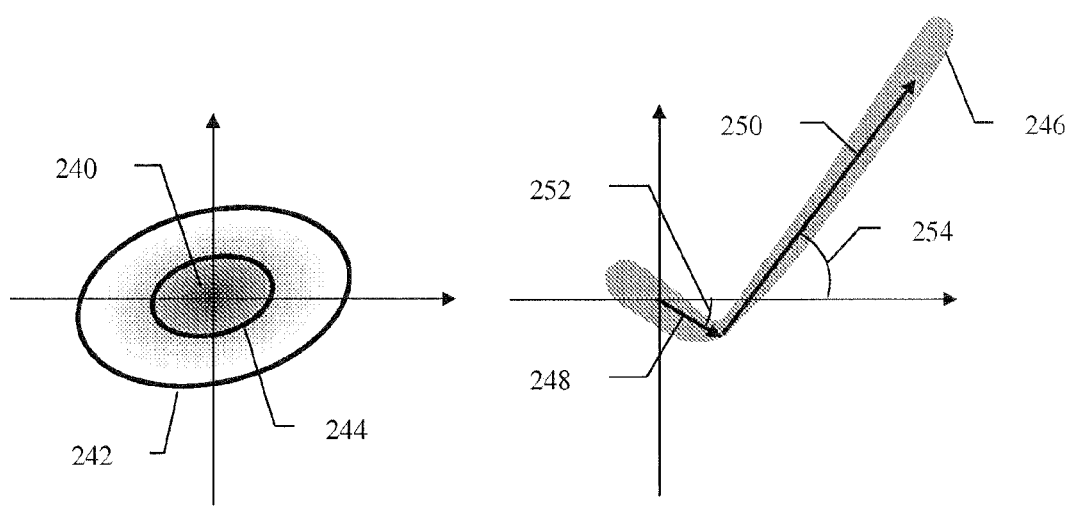
FIG. 9 illustrates shape recognition of the puck (on the left) and hockey stick (on the right).

Although there is only one puck on the ice during the game, typically, more than one measurement will be considered as a puck candidate. Therefore, in the puck detector 214 various features are fused together to determine the most likely puck measurement. There may be two groups of features computed in step 216. The first group of features is designed to capture the elliptic signature of the puck at various extents. The left part of FIG. 9 illustrates the puck signature 240. Note that the puck's image is smeared due to motion blur. The contours 242 and 244 shows two possible Hough transform integration paths, $C_r$, that may be used to detect the puck's elliptic shape. These features may be employed on the puck image, Y (may be the gray scale part of the image) as follows:

$$F_{1,r} = \frac{1}{C_r} \oint_{C_r} Y(s) ds; r = 0, \ldots, R \tag{3}$$

The second group of features is designed to detect a hockey stick. In the search for the puck, measuring the likelihood that a measurement originates from a hockey stick helps eliminate it from mistakenly being detected as a puck. (Often, the tip of the hockey stick resembles the puck image due to the high reflectivity of the part connecting the stick to its tip.) The right part of FIG. 9 illustrates the stick's signature 246. The hockey stick's short axis $C_1$ 248 and long axis $C_2$ 250 may be projected at different orientations, defined by the angle $\theta_1$ 252 and the angle $\theta_2$ 254, respectively.

Thus, the first feature in this group may respond to the signature of a hockey stick as follows:

$$F_{2,1} = \max_{\theta_1, \theta_2} \left( \frac{1}{C_1} \oint_{C_1} Y_e(r, \theta_1) dr + \frac{1}{C_2} \oint_{C_2} Y_e(r, \theta_2) dr \right), \tag{4}$$

where $Y_e$ is the edge image of Y. Features $F_{2,2}$ and $F_{2,3}$ respond to the color content of the stick signature as follows:

$$F_{2,2} = \frac{1}{C_1} \oint_{C_1} U(r, \theta_1) dr + \frac{1}{C_2} \oint_{C_2} U(r, \theta_2) dr \tag{5}$$

$$F_{2,3} = \frac{1}{C_1} \oint_{C_1} V(r, \theta_1) dr + \frac{1}{C_2} \oint_{C_2} V(r, \theta_2) dr \tag{6}$$

Where, U and V contain the color information of the image in a YUV color model. Features $F_{2,2}$ and $F_{2,3}$ prevent confusing the red or blue lines on the ice with the stick's signature. Fused together by supervised classifier 218, for instance, these features (3-6) successfully discriminate the puck's measurement when imaged at the open. One of ordinary skill in the art will appreciate that similar features may be defined to detect other rigid objects such as, but not limited to, a basketball, a soccer ball, etc.

Foreground regions found to be representative of a human or a group of humans are further characterized in step 222. Real-world measures are estimated out of the foreground's outline in order to obtained two metrics. The first metric is the foreground's point of contact with the ground or the center of players' feet on the ground 264. The second metric is a scalar value, termed environs, which is indicative of the area of projection on the ground of a foreground region 266. The environs is used by the tracking method to assess the number of players projected by a foreground, Next, the computation of these two metrics is described.

Figure 10:
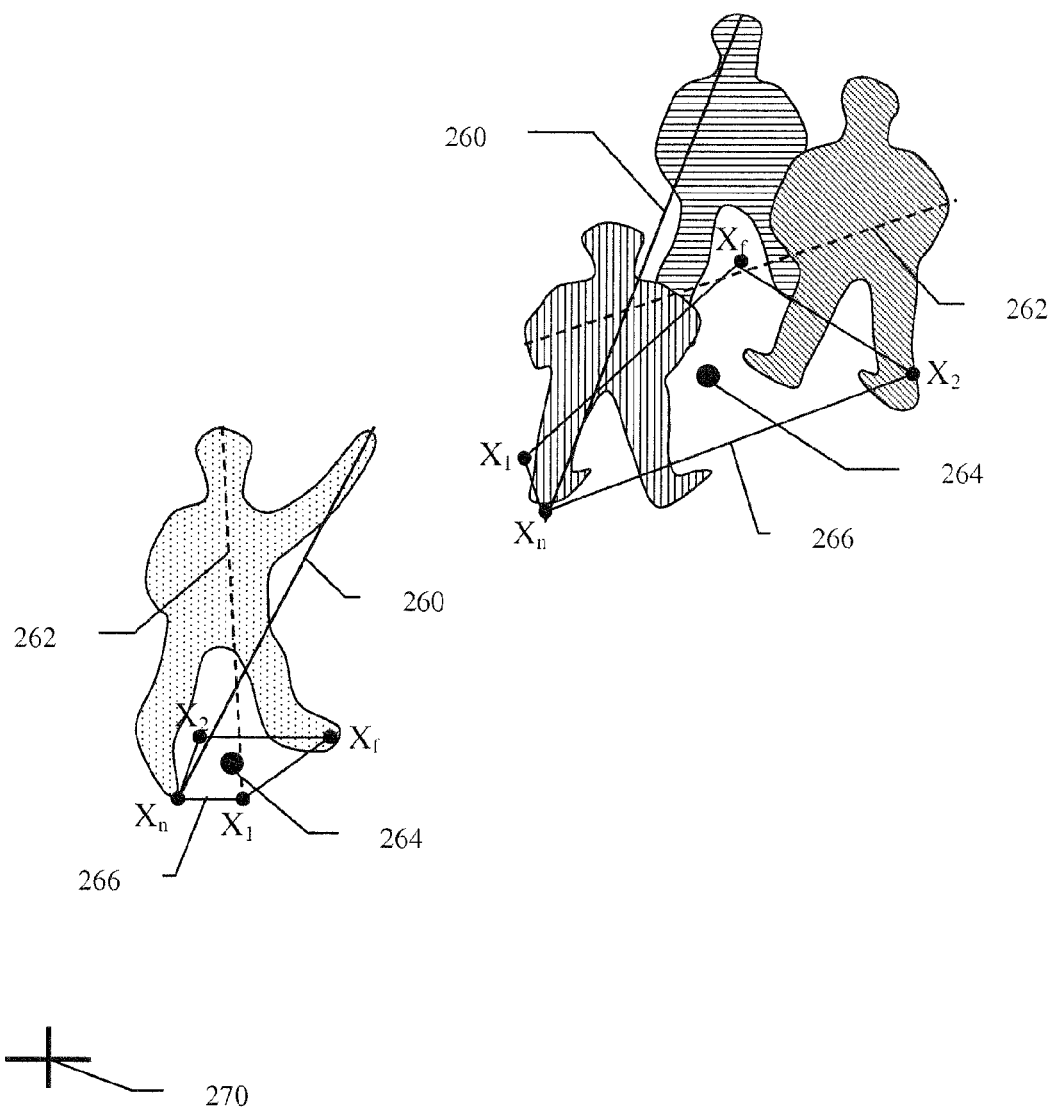
FIG. 10 demonstrates outlines analysis in which a foreground's environs and the center of foreground projection on the ground (feet location center) are calculated.

FIG. 10 illustrates two foreground regions, a single-player foreground and a multi-player foreground. As shown, 260 is a line connecting the nearest outline point, $P_n \equiv (u_n, v_n)$, and the farthest outline point, $P_f \equiv (u_f, v_f)$, to the camera's projected position on the ground 270. These nearest and farthest points are in the vicinity of the feet and heads, respectively. Therefore, assuming a player's height of h, the real-world location of these points can be computed, resulting in $x_n=(x_n, 0, z_n)$ and $x_f=(x_f, h, z_f)$, respectively. The projections of $x_n$ and $x_f$ on the ground, $X_n=(x_n, 0, z_n)$ and $X_f=(x_f, 0, z_f)$, are shown in FIG. 10. Similarly, 262 is the outline fitting line, extending between $P_1\equiv(u_1, v_1)$ and $P_2\equiv(u_2, v_2)$. Defining $h_1$ and $h_2$ as the height values associated with outline's points $P_1$ and $P_2$, the corresponding real-world points can be computed, resulting in $x_1=(x_1, h_1, z_1)$ and $x_2=(x_2, h_2, z_2)$. The height values, $h_1$ and $h_2$, may be approximated by $\|P_d-P_n\|/\|P_f-P_n\|*h$, where $P_d$ is the nearest point on line 260 to $P_1$ and $P_2$, respectively. The projections of $x_1$ and $x_2$ on the ground, $X_1=(x_1, 0, z_1)$ and $X_2=(x_2, 0, Z_2)$, are shown in FIG. 10.

The environs is a scalar value proportional to the area enclosed by the quadrilateral 266 and is defined by the points: $X_1$, $X_2$, $X_n$, and, $X_f$. The environs is a real-world metric that can suggest, for example, if a foreground encloses on one player (single-player measurement) or rather encloses on a group of connected/occluding players (multi-player measurement). It may also be used to compare between foreground regions; meaning, if a foreground region representative of five players in a previous frame, is split into two foreground regions in the current frame, then comparing the two foregrounds' environs values can suggest a likely distribution of the five players between the two foreground regions. The usage of the environs metric for resolving tracking under occlusion will be explained below.

The second metric, the foreground's point of contact with the ground 264 or the center of feet position, is estimated as follows. The centroid, $P_c\equiv(u_c, v_c)$, of the outline is in the vicinity of a players' body center, and, therefore, its real-world position $x_c$ can also be calculated: $x_c=(x_c, -h/2, z_c)$. The points: $x_c$, $x_n$, and $x_f$ may be used to estimate the center of feet location considering their projections on the ground as follows:

$$x_m \equiv ((x_c+x_n+x_f)/3, 0, (z_c+z_n+z_f)/3) \quad (7)$$

FIG. 10 shows the feet position for a foreground encloses on one player and a foreground encloses on a group of connected/occluding players. Note that these estimates for the environs and the center of feet location metrics are real-world measures that are valid for any camera position relative to the scene.

The last step in the measurement characterization procedure 44 includes compiling a list of measurements and their associated parameters 224 such as the foreground and its outline, the environs, the center of feet position, the ROI, etc. This measurement list is passed to the object tracking algorithm 280 for further processing.

Figure 11:
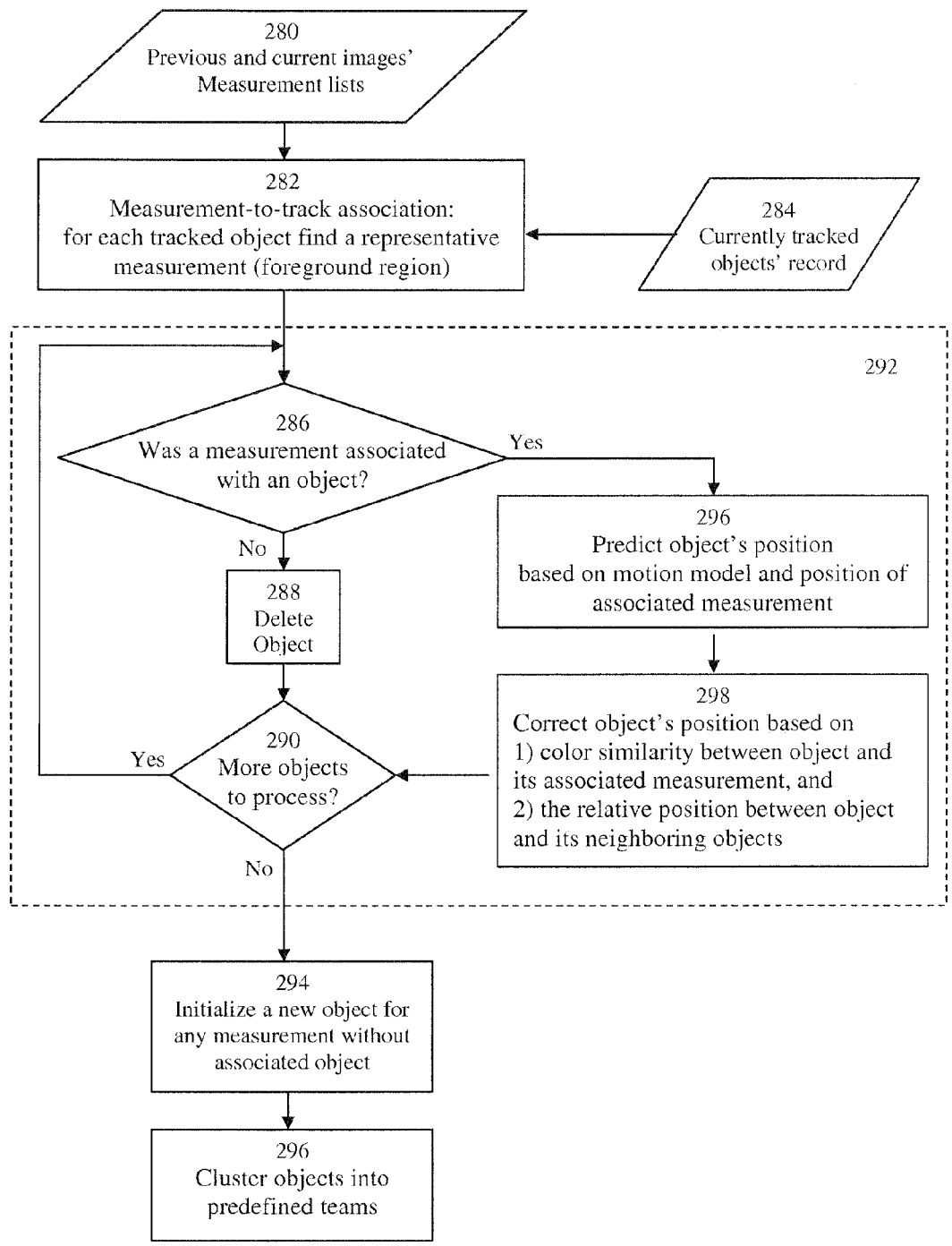
FIG. 11 shows a flow diagram of the object tracking algorithm.

FIG. 11 is the block diagram of the object tracking algorithm. The tracker objective is to initiate, maintain, and delete tracks, where a track is a data structure representing a currently tracked object within the field of view. A track's data structure stores instantaneous information regarding the object state such as, but not limited to, its position, velocity, and team affiliation. At each iteration of the tracking algorithm, the tracker updates existing tracks' information and initiates and/or deletes tracks as necessary.

During a game, players collide with and occlude each other rapidly and unpredictably. In addition, each player's pose and position may change considerably from one frame to the other. This dynamic translates into foreground regions that frequently merge and split through successive frames. This behavior complicates the tracking task especially in sports such as hockey and basketball where players constantly and closely interact with each other. In the measurement-to-track association part of the algorithm 282 the tracker starts with linking measurements from the previous frame (iteration) to measurements in the current frame (iteration) by employing a Merge/Split Detector. The measurement-to-track association procedure will be explained through the four frame foreground transition analysis in FIG. 12.

Figure 12:
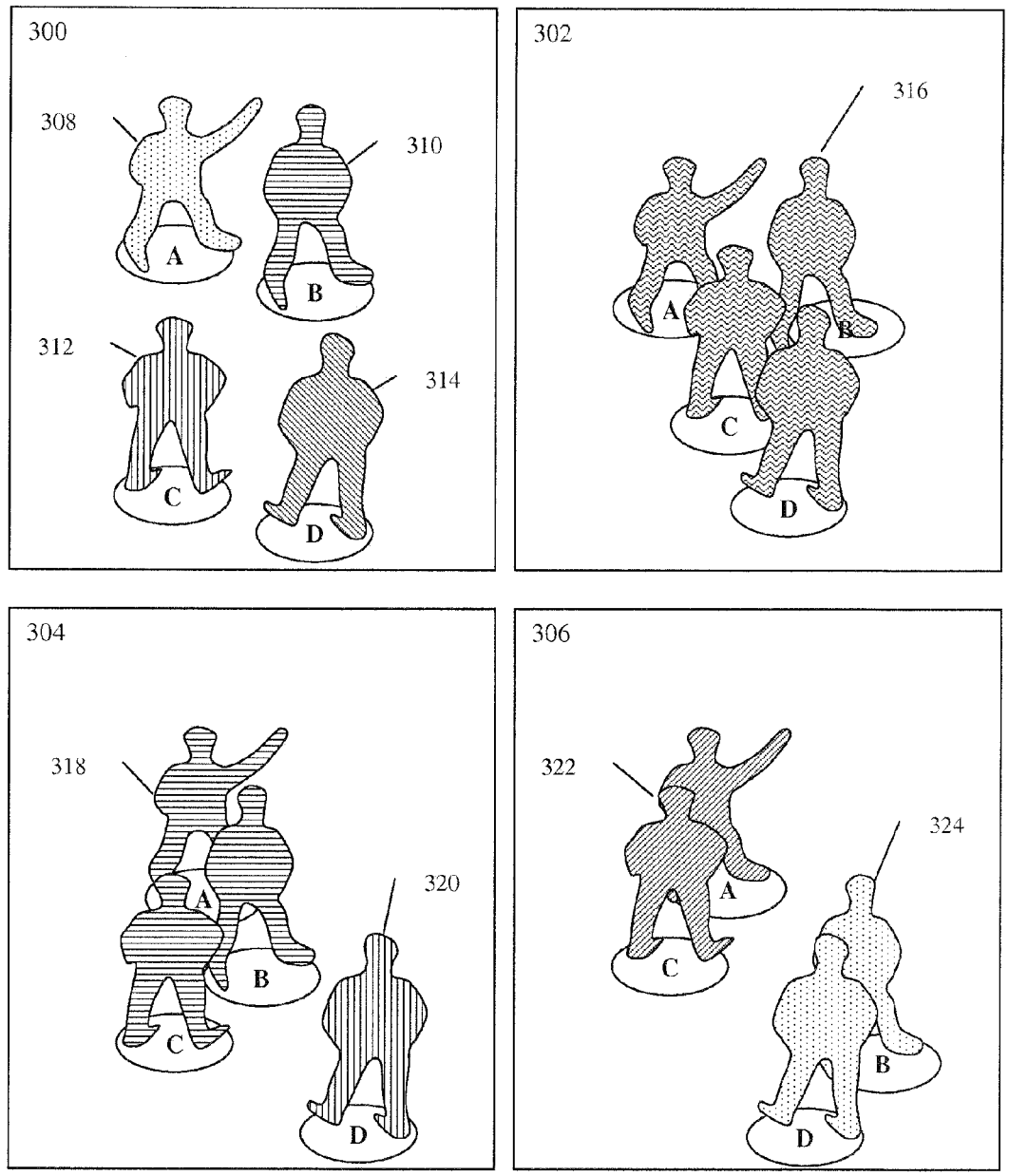
FIG. 12 illustrates foregrounds merge and split transitions through successive frames.

FIG. 12 demonstrates the transitions of foreground regions in four successive frames. In a first frame 300, there are four foreground regions, 308, 310, 312, and 314, each representative of one object, A, B, C, and D, respectively. In a second frame 302, the four foregrounds from previous frame are merged into one large foreground 316. This merge transition is detected by the tracking algorithm based on foreground regions overlap. Thus, once a merge was detected, the objects assigned to the four foregrounds in frame 300 are assigned to the one foreground in frame 302.

Next, in the third frame 304, the one foreground 316 from previous frame is split into two foregrounds, 318 and 320. In this split transition the algorithm needs to distribute the four objects from the second frame 302 between the two foregrounds in the third frame 304. Hence, based on the environs value of each foreground 318 and 320, three objects are assigned to the foreground with the larger environs 318 and one object is assigned to the foreground with the smaller environs 320. The decision as to which object out of the four: A, B, C, and D, to assign to which foreground out of the two: 318, and 320, is based on spatial distance and on color similarity between each object and each foreground. In the fourth frame 306, both a split and a merge are occurred. In this case, the four objects associated with foregrounds 318 and 320 in the third frame 304, will be distributed evenly between the two foregrounds 322 and 324 in the forth frame 306, since theirs environs values are comparable.

Using the environs metric to decide how to distribute a plurality of objects among a plurality of foregrounds after a split transition is essential for resolving the measurement-to-track association problem especially when tracking highly dynamic groups of objects such as players. The distribution of a plurality of objects among a plurality of foregrounds is selected as follows. First, for each possible distribution the ratios between each foreground's environs and the number of objects assigned to it are calculated. Then, the distribution that resulted in ratios with minimum variance is selected. For example, in frame 304 there are three possible distributions: a) one object assigned to foreground 318 and three objects assigned to foreground 320, b) two objects assigned to foreground 318 and two objects assigned to foreground 320, c) three objects assigned to foreground 318 and one object assigned to foreground 320. Therefore, the corresponding ratios are: a) foreground 318's environs divided by one and foreground 320's environs divided by three, b) foreground 318's environs divided by two and foreground 320's environs divided by two, and, c) foreground 318's environs divided by three and foreground 320's environs divided by one. Given that the environs value is proportional to the area of a foreground region's projection on the ground, it can be seen that the distribution in case c) resulted in ratios with minimum variance.

Back to FIG. 11, completing the measurement-to-track association procedure 282, the following group of steps 292 updates the state of each track independently, and, therefore, may be employed in parallel. First, if a track is not represented by a measurement 286, the track is deleted 288, assuming that the object moved out of the scene. Otherwise, the track's current position is predicted in step 296. The prediction of a track's current position, $x(k)$, is computed based on a motion model (constant velocity model for instance) as $x_p(k)$ and based on the position of the associated measurement $x_m(k)$, as follows:

$$x \equiv x(k) = a * x_p(k) + (1-a) * x_m(k) \quad (8)$$

where, a is a scalar proportional to the measurement environs. Hence, for a small environs (single-player measurement) a is close to zero, and therefore x(k) is close to the associated measurement feet's position estimate, $x_m(k)$. While for a large environs (multi-player measurement), a is close to one, and therefore x(k) is closely set to $x_p(k)$.

Next, the object's current position is further corrected (refined) 298 based on color analysis and the relative position of the object and its neighboring objects. This position refining is especially important when several tracks are associated with one measurement, as illustrated, for instance, in FIG. 12, frames 2. In this case, knowledge of the objects' color characteristic and their previous relative positions is instrumental in determining their most likely current position within the foreground region.

Color is an important characterizing feature of objects. It is invariant to pose, orientation, and resolution, and it is relatively simple to model using, for instance, a discrete three-dimensional histogram. The tracker builds a color histogram for each track at initiation 294 and continues adding samples into this histogram as long as the environs of the track's assigned measurement is small enough (indicative of a single player). This way, pixels drawn from the player's foreground region are most likely to belong to this player only and not to other players, thereby allowing for accurate color representation of the tracked player. A track's color-model may be three dimensional YUV color histogram with, for instance, an 8 cube bin size.

Each track's histogram gives a probabilistic representation of its player. This probabilistic representation may be used to determine the probability f(I(u, v)) of any pixel I(u, v) to belong to a certain tracked player. Particularly, the tracker considers a player's ROI r≡roi(x, w, h) defined by the projection of a hypothetical player at position x and with w width and h height. Note that this rectangular region is defined in image space and is computed as a function of a real-world player's position, width (~2 ft) and height (~6 ft). As a result, regardless of the player's position relative to the camera, this ROI will always be tightly enclosing on its figure.

Having a player's ROI r, the similarity of the region it encloses to a specific player's track color-model is determined by $$\text{Sim}(r, r_e) = 2 * \sum_{u,v \in r} f(I(u, v)) - \sum_{u,v \in r_e} f(I(u, v)) \quad (9)$$

where $r_e$ is an extended version of the ROI r. This similarity function subtracts the likelihood of pixels from a frame (the region between $r_e$ and r) around the player's ROI from the likelihood of pixels from within a player's ROI r. This similarity function is related to Laplace filtering, and results in a highly discriminative function response when the ROI correctly fits the player figure.

The tracker may use a particle-filtering technique in order to get the most likely player's position in the vicinity of x(k) in step 298. Particle filtering is a Monte Carlo technique to approximate the posterior probability, p(x(k)|z(k)), by a set of samples and their weights, $\{\pi_i, \bar{\omega}_i\}_{i=1}^N$. Each particle, i, has its own hypothesis regarding the current track state, where a track state may be defined by $\pi_i \equiv \{x_i, y_i, z_i, w_i, h_i\}$.

Specifically, each particle hypothesizes that the track's position is at location $x_i = (x_i, y_i, z_i)$ and that the player's width and height are $w_i$ and $h_i$, respectively. Next, each particle's hypothesis is weighed by:

$$\bar{\omega}_i = \text{Sim}(r, r_e) \cdot \left(1 - \exp\left(-\frac{\|x_i - x_n(k-1)\|}{\|x_i - x(k-1)\|}\right)\right) \quad (10)$$

where $x_n$ is the position of the nearest track to $x_i$ (excluding the current track), the term $\text{Sim}(r, r_e)$ reflects the color similarity, and the term $(1-\exp(-\|x_i-x_n\|/\|x_i-x\|))$ weighs higher those particles that are closer to x relative to $x_n$. The second term has the effect of repelling or penalizing particles positioned nearby other neighboring objects. Note that this way even though each object is being tracked independently, the formation of the other objects affects the propagation of this object's particles. Tracking each object independently is advantageous when multi-threading implementation is desired.

Thus, in the particle filtering method, each particle 1) is influenced by the "experience" of the overall population of particles and 2) impacts the overall particles' population by its own "experience". Specifically, the following steps are carried out:

1. The particles are re-sampled with probability and with replacement; particles with higher weights will be duplicated often while particles with lower weights may be excluded. (In order to prevent degeneration of the particle population, a small random deviation is added to the particles' state variables.)
2. The particles' population spatially evolves to better fit the object they track through displacement:

$$x_i(k) = x_i(k-1) + (x(k) - \hat{x}(k-1)) \quad (11)$$

3. Then, the particles' weights are computed as defined in (10) and are normalized so that $$\sum_{i=1}^{N} \bar{\omega}_i = 1.$$

4. Next, the new position of the player's track is refined to, $$\hat{x}(k) = \sum_{i=1}^{N} \bar{\omega}_i \cdot x_i. \quad (12)$$

Employing particle filtering is computationally expensive because the similarity metric in (10) needs to be computed for each particle. In addition, enough particles should be included in the analysis to accurately approximate the posterior probability p(x|z). To facilitate real-time tracking an integral image method may be used. An integral image method is a technique that can be used to speed up computation carried out over a rectangular support. In our case, this is the similarity metric that is computed for all the ROIs of all the particles that are confined within a window termed here the canonical window. Pre-calculating the integral image of f(I(u, v)) within the canonical window and then extracting $$\sum_{u,v \in r} f(I(u, v))$$

for any sub-rectangular region from it, allows the tracking algorithm to comply with real-time system requirements.

Figure 13:
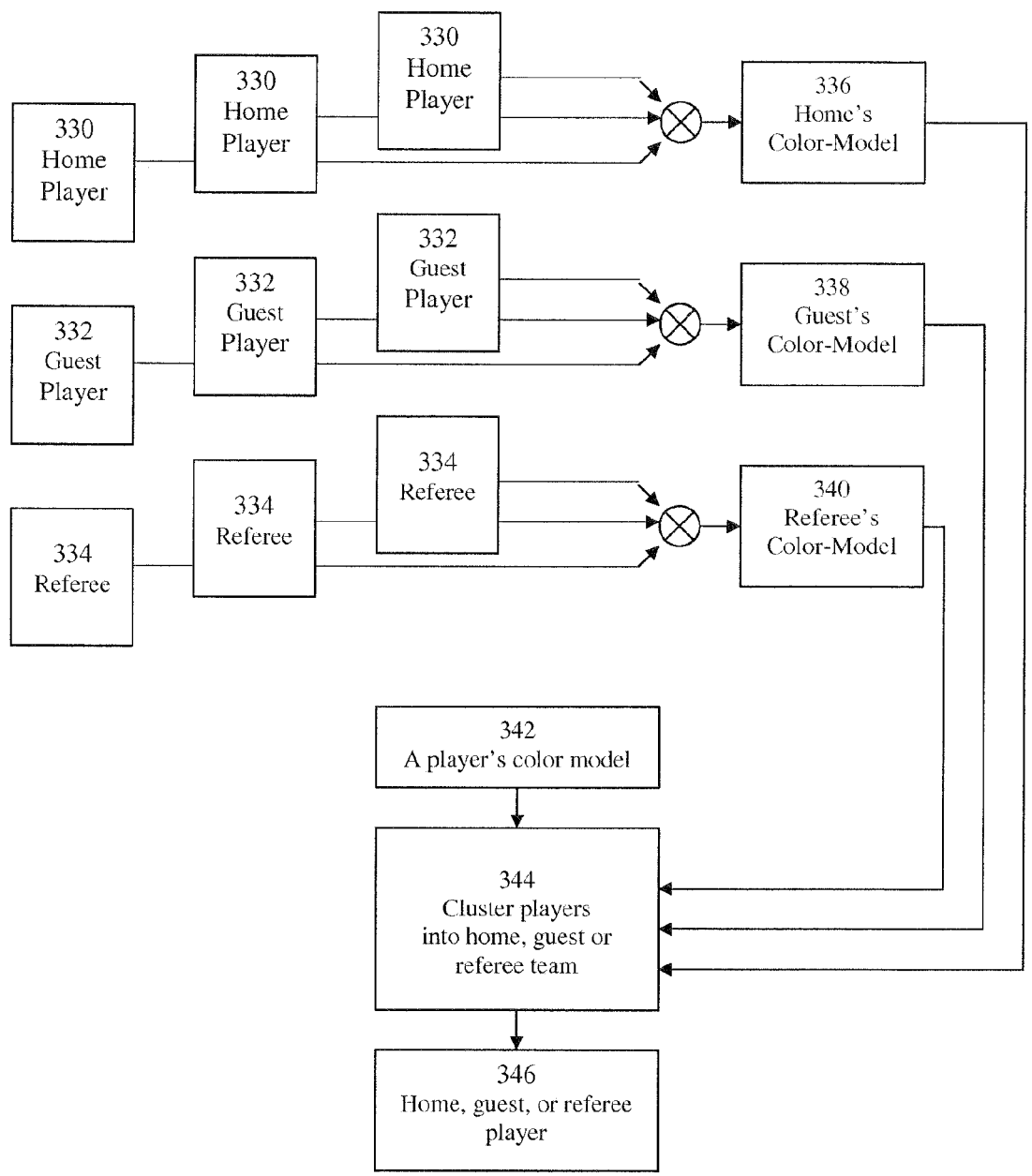
FIG. 13 shows a block diagram of the team identification training used for players' team classification.

At the end of each tracking iteration, the tracking algorithm automatically identifies the team affiliation of all active tracks 296. This is done by comparing the color-model (histogram) of each player's track to the color-models (histograms) of home, guest, and referee teams. The histograms, representing the teams' color-models, may be built at the very beginning of the tracking operation, before the game starts, with the help of a human operator as demonstrated in FIG. 13. An operator may manually select several tracks of players from the home team 330, the tracker, then, compiles the color-models of these players, resulting in a home team's color model 336. Similarly, the operator may select tracks of several guest players 332 and several referees 334 for the tracker to compile the guest team's 338 and the referee team's 340 color-models. Once the team's color-models are built, the tracker is ready to cluster actively tracked objects into teams through comparison of each track's color-model (say histogram) with each of the teams' color-models (say histograms) 344.

There are many ways to measure the similarity or distance between two color histograms, using measures such as normalized-correlation, histogram intersection, Kullback Leibler divergence, and Bhattacharyya coefficient. For example, the Bhattacharyya coefficient is defined as:

$$s_{h,g,r} = \Sigma \sqrt{p_t(m) \cdot p_{h,g,r}(m)}, \quad (13)$$

where, an entry in a player's histogram, $p_t(m)$, is compared with the corresponding entry in a home, guest, or referee's histogram, $p_{h,g,r}(m)$.

Adding the team identification information to a player's positional data makes the tracking system a powerful indexing engine. It extends its game analysis capacity from merely analyzing player-based-performance to analyzing team-based performance and team-based strategy. For example, knowing the team affiliation of a group of players, it will be possible to visualize their relative propagation and formation during critical parts of the game.

Figure 14:
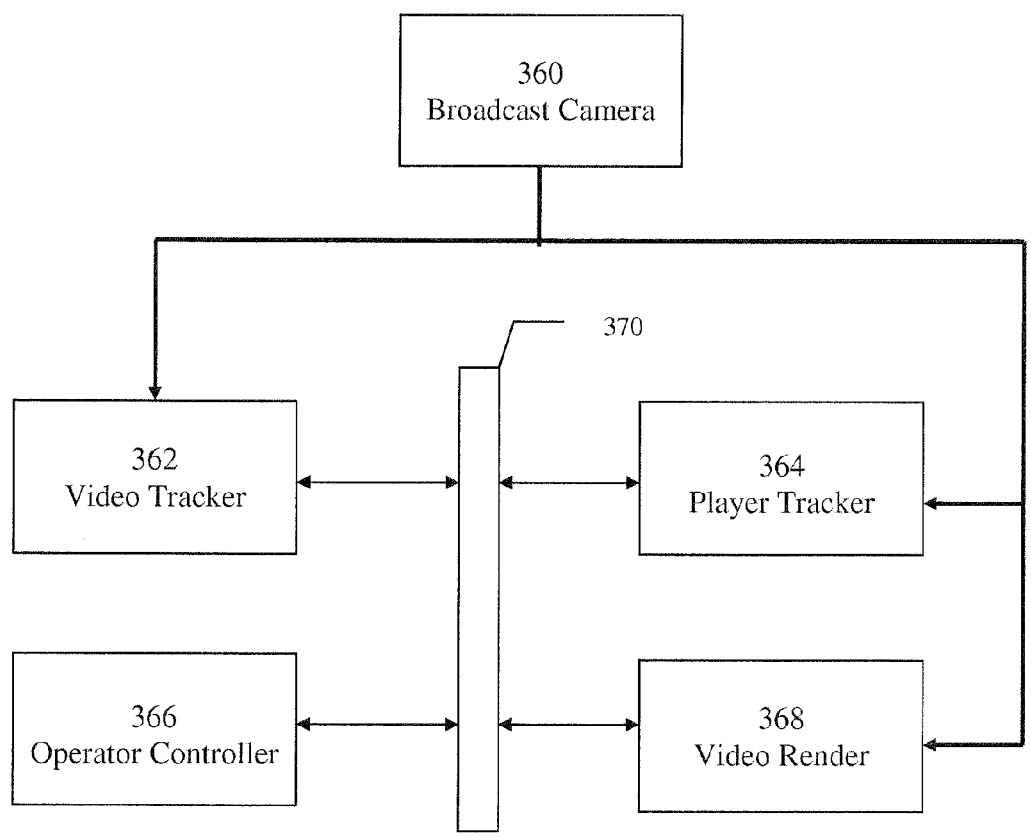
FIG. 14 shows an alternative embodiment of the invention featuring the player tracking system component employed to guide a video insertion system.

Another embodiment for this invention may be as a component of a broadcast enhancement system. FIG. 14 illustrates a system that receives a feed from the broadcast camera 360. This can be a dedicated feed from a camera covering the game play, an isolated point of view camera, or a program feed which cuts between video from multiple cameras. The Video Tracker 362 analyzes the incoming video for landmarks and produces a representation of the PTZ of the video, which is combined with camera position information to produce a camera model similar to the calibration process. The Tracker updates the position over time through frame to frame analysis of features in the video such as texture analysis performed by the stabilization routine 122 in this tracking method invention 364. These video (camera) tracking techniques 362 are well known in the field (U.S. Pat. Nos. 5,808,695 and 6,529,613). Alternately, the Video tracker can rely on PTZ sensors on the camera or a combination of sensors and image stabilization, which is also known in the field (U.S. Pat. No. 6,100,925). The resulting camera model may be sent over the Ethernet connection 370 to the Player Tracker 364, Video Render 368 and Operator controller 366.

The Player Tracker 364 receives the camera information from Video Tracker, and updates the camera model for the particular frame, replacing the functionality of the calibration (FIG. 3) and the stabilization 122 procedures. In this embodiment, the background subtraction in step 42 is replaced with a color chromakey step based on the dominant background colors. Chromakeying techniques to handle occluding foreground objects are well known by those familiar with the art (U.S. Pat. No. 7,015,978). The object tracking steps 46-52, generate tracks consistent with the camera model received from the Video Tracker. The resulting information may be sent over the Ethernet connection 370 to the Render module 368 and Operator Controller 366.

The Render 368 is responsible for generating and mixing graphics into the video feed. It analyzes the input video to find the dominant colors of the background, if chromakeying of foreground objects is desired. The Render receives camera orientation information from the Video Tracker and players' location from the Player Tracker. It uses this data to warp artwork related to the objects that is realistically rendered into the video scene. Alternately, it can be used to relay data statistics in a burn-in graphic. In the typical scenario, a mixed output is sent out for broadcast.

The operator controller 366 enables a human operator to monitor and control the broadcast enhancement process. It provides feedback on the state of the Video Tracker module 362 with diagnostics overlaid on a video window. It allows the monitoring of Player Tracker 364 data output, with the option to select information from a player of interest. It enables the selection of graphics and monitoring of results within the video render 368. Control of the Video Tracker 362, Player Tracker 364 and Video Render 368 may be achieved through Ethernet communications 370.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention. Modifications may readily be devised by those ordinarily skilled in the art without departing from the spirit or scope of the present invention.

APPENDIX

This section contains a glossary of terms, including commonly used terms of art and specific terms coined in this document to help describe this invention.

A BACKGROUND—the regions in a video frame that belong to the static part of the scene. For example, in a video of a hockey game the ice, boards, creases, may be part of the background.

BACKGROUND SUBTRACTION—is typically the process of separating a video frame into background and foreground regions. This separation may be with respect to the reference image and may be represented by the mask.

CAMERA CALIBRATION—the process of producing the camera's parameters, including, but not limited to, the gimbal real-world position, pan, tilt, roll, and image distance from the lens. Camera parameters are typically used to relate a point in the image space to its correspondence in real-world space and vise versa.

AN ENVIRONS—a scalar value indicative of the area of projection on the ground of the foreground region.

A FOREGROUND—the regions in a video frame that belong to the dynamic part of the scene; or alternatively, regions that are not part of the background. For example, in a video of a hockey game the players, referees, and puck, may be part of the foreground.

AN IMAGE SPACE—a two-dimensional space of the scene's image as projected by the camera. Image space coordinates denote the column and row number of a pixel's location in the image.

A MASK—is a binary image with pixel values set to 1 where the corresponding video frame's pixels are part of the foreground, and set to 0 where the corresponding video frame's pixels are part of the background.

A MEASUREMENT—a data structure containing information about a foreground such as foreground's outline, foreground's point of contact with the ground, and foreground's environs.

AN OBJECT—is a physical entity of interest, typically in motion, in the scene.

AN OUTLINE—an array of image pixel coordinates that delineates a foreground element is typically referred to as an outline. The array's coordinates point to the boundary pixels of the foreground.

REAL-WORLD SPACE—a three-dimensional space of the scene's physical space. Real-world coordinates are in physical units such as meters or feet.

A REGION-OF-INTEREST (ROI)—sub-region in an image specified by the left, right, top, and bottom sides of a bounding rectangle.

A REFERENCE IMAGE—is an image that models a complete camera view of the static scene without occlusion by moving objects.

A TRACK—a data structure containing information about a tracked object such as object's position, velocity, and ROI.

A VIDEO FRAME—a single framed image in a sequence of images that captures a snapshot of a dynamic scene.

What is claimed is:

1. A method of extracting data from a video stream, said method being executed by at least one processor and comprising:
   updating a reference image based on a first image, wherein the reference image is representative of a statistical model of a background scene, including multiple color values for each pixel within the reference image;
   locating a first plurality of foregrounds in the first image by comparing the reference image with the first image;
   computing for each foreground from the first plurality of foregrounds foreground parameters, measuring foreground's image and real-world characteristics; and
   assigning an object track to each foreground from the first plurality of foregrounds if, based on the foreground parameters, it was determined to be representative of a single one of a plurality of pre-selected objects, and wherein the object track is a data structure including a position, an ROI (region of interest), and a color.

2. The method of claim 1 further comprising:
   updating the reference image based on a second image,
   locating a second plurality of foregrounds in the second image by comparing the reference image with the second image;
   computing for each foreground from the second plurality of foregrounds foreground parameters, measuring foreground's image and real-world characteristics.

3. The method of claim 2 further comprising:
   associating object tracks assigned to foregrounds from the first plurality of foregrounds with foregrounds from the second plurality of foregrounds.

4. The method of claim 3 wherein associating further includes:
   recognizing a foreground from the second plurality of foregrounds to be a merge of at least two foregrounds from the first plurality of foregrounds; and
   associating the object tracks assigned to the at least two foregrounds from the first plurality of foregrounds with the foreground from the second plurality of foregrounds.

5. The method of claim 3 wherein associating further includes:
   recognizing at least two foregrounds from the second plurality of foregrounds to be a split from one foreground from the first plurality of foregrounds; and
   associating the object tracks assigned to the one foreground from the first plurality of foregrounds with the at least two foregrounds from the second plurality of foregrounds, wherein association of the object tracks to each foreground of the at least two foregrounds is done based on their foreground parameters.

6. The method of claim 3 further comprising:
   computing a predicted position for each object track based on a motion model and based on the foreground parameters of the associated foregrounds.

7. The method of claim 6 further comprising:
   refining the predicted position of each object track based on:
   a similarity between the object track's color data and the color of an image region defined by an intersection of the object track's ROI (region of interest) and the associated foreground image region; and
   the object track's position relative to other neighboring object tracks' positions.

8. The method of claim 1, wherein foreground parameters further include a real world point of contact with the ground of the foreground region if it were representative of one or more of the plurality of pre-selected objects.

9. The method of claim 1, wherein foreground parameters further include an environs which is a scalar value, indicative of the size of projection on the ground of the foreground region.

10. A non-transitory computer-readable storage medium storing a set of instructions that is executable by a processor, the set of instructions, when executed by the processor, causing the processor to perform operations comprising:
    updating a reference image based on a first image, wherein the reference image is representative of a statistical model of a background scene, including multiple color values for each pixel within the reference image;
    locating a first plurality of foregrounds in the first image by comparing the reference image with the first image;
    computing for each foreground from the first plurality of foregrounds foreground parameters, measuring foreground's image and real-world characteristics; and
    assigning an object track to each foreground from the first plurality of foregrounds if, based on the foreground parameters, it was determined to be representative of a single one of a plurality of pre-selected objects, and wherein the object track is a data structure including a position, an ROI (region of interest), and a color.

11. The non-transitory computer-readable storage medium of claim 10, wherein the operations further comprise:
    updating the reference image based on a second image, locating a second plurality of foregrounds in the second image by comparing the reference image with the second image; and computing for each foreground from the second plurality of foregrounds foreground parameters, measuring foreground's image and real-world characteristics.

12. The non-transitory computer-readable storage medium of claim 11, wherein the operations further comprise:

associating object tracks assigned to foregrounds from the first plurality of foregrounds with foregrounds from the second plurality of foregrounds.

13. The non-transitory computer-readable storage medium of claim 12, wherein the associating further includes:

recognizing a foreground from the second plurality of foregrounds to be a merge of at least two foregrounds from the first plurality of foregrounds; and associating the object tracks assigned to the at least two foregrounds from the first plurality of foregrounds with the foreground from the second plurality of foregrounds.

14. The non-transitory computer-readable storage medium of claim 12, wherein the associating further includes:

recognizing at least two foregrounds from the second plurality of foregrounds to be a split from one foreground from the first plurality of foregrounds; and associating the object tracks assigned to the one foreground from the first plurality of foregrounds with the at least two foregrounds from the second plurality of foregrounds, wherein association of the object tracks to each foreground of the at least two foregrounds is done based on their foreground parameters.

15. The non-transitory computer-readable storage medium of claim 12, wherein the operations further comprise:

computing a predicted position for each object track based on a motion model and based on the foreground parameters of the associated foregrounds.

16. The non-transitory computer-readable storage medium of claim 15, wherein the operations further comprise:

refining the predicted position of each object track based on:

a similarity between the object track's color data and the color of an image, region defined by an intersection of the object track's ROI (region of interest) and the associated foreground image region; and the object track's position relative to other neighboring object tracks' positions.

17. A system for automatically tracking multiple objects in a video stream, comprising:

an object position system that tracks data for a three-dimensional position, a velocity, and an identity of each one of the objects;

a non-transitory memory device that stores information relating to the object data and executable program code; and a processor executing the program code to,
update a reference image based on a first image, wherein the reference image is representative of a statistical model of a background scene, including multiple color values for each pixel within the reference image;

locate a first plurality of foregrounds in the first image by comparing the reference image with the first image;

compute for each foreground from the first plurality of foregrounds foreground parameters, measuring foreground's image and real-world characteristics; and assign an object track to each foreground from the first plurality of foregrounds if, based on the foreground parameters, it was determined to be representative of a single one of a plurality of pre-selected objects, and wherein the object track is a data structure including a position, an ROI (region of interest), and a color, the software element further comprising a manager module to compile and output the object data.

18. The system of claim 17, wherein the processor executes the program code to further:

update the reference image based on a second image, locate a second plurality of foregrounds in the second image by comparing the reference image with the second image; and compute for each foreground from the second plurality of foregrounds foreground parameters, measuring foreground's image and real-world characteristics.

19. The system of claim 18, wherein the processor executes the program code to further:

associate object tracks assigned to foregrounds from the first plurality of foregrounds with foregrounds from the second plurality of foregrounds.

20. The system of claim 19, wherein the associating further includes:

recognizing a foreground from the second plurality of foregrounds to be a merge of at least two foregrounds from the first plurality of foregrounds; and associating the object tracks assigned to the at least two foregrounds from the first plurality of foregrounds with the foreground from the second plurality of foregrounds.

21. The system of claim 19, wherein the associating further includes:

recognizing at least two foregrounds from the second plurality of foregrounds to be a split from one foreground from the first plurality of foregrounds; and associating the object tracks assigned to the one foreground from the first plurality of foregrounds with the at least two foregrounds from the second plurality of foregrounds, wherein association of the object tracks to each foreground of the at least two foregrounds is done based on their foreground parameters.

* * * * *